US012266250B2

(12) United States Patent
Williams et al.

(10) Patent No.: US 12,266,250 B2
(45) Date of Patent: Apr. 1, 2025

(54) PACKAGE ALARM MAT AND CONTAINER DEVICE

(71) Applicants: Preston Williams, Southfield, MI (US); Bonita Williams, Southfield, MI (US)

(72) Inventors: Preston Williams, Southfield, MI (US); Bonita Williams, Southfield, MI (US)

( * ) Notice: Subject to any disclaimer, the term of this patent is extended or adjusted under 35 U.S.C. 154(b) by 17 days.

(21) Appl. No.: 18/184,166

(22) Filed: Mar. 15, 2023

(65) Prior Publication Data

US 2023/0351874 A1 Nov. 2, 2023

Related U.S. Application Data

(60) Provisional application No. 63/337,219, filed on May 2, 2022.

(51) Int. Cl.
*G08B 13/22* (2006.01)
*G08B 7/00* (2006.01)

(52) U.S. Cl.
CPC ............... *G08B 13/22* (2013.01); *G08B 7/00* (2013.01)

(58) Field of Classification Search
CPC G08B 13/1472; G08B 13/1436; G08B 21/24; G07C 2009/0092; G01S 19/16
See application file for complete search history.

(56) References Cited

U.S. PATENT DOCUMENTS 4,551,713 A 11/1985 Aossey
4,924,214 A 5/1990 Hill
6,707,386 B1 3/2004 Pruisner
2005/0040954 A1 2/2005 McNally
2009/0195393 A1 8/2009 Tegeler
2014/0305928 A1* 10/2014 Thompson ............... H05B 3/74 219/448.12
2016/0343220 A1* 11/2016 Grabham ........... G08B 13/1472
2019/0277552 A1* 9/2019 Vu ......................... F25D 23/025
2020/0364996 A1* 11/2020 Sollars ..................... G08B 3/10
2021/0090092 A1* 3/2021 Kammes ............ G06Q 30/0185
2022/0240704 A1* 8/2022 Castagno ........... A47G 29/1209

* cited by examiner

*Primary Examiner* — Mirza F Alam

(74) *Attorney, Agent, or Firm* — Brennan, Manna & Diamond, LLC

(57) ABSTRACT

The present invention relates to a novel package alarm device. The device is a storage box or door mat for delivered packages. The device comprises a base component with pressure sensors, such that when a package is placed on the base component, the weight and time of the package delivery is identified. Further, the base component comprises an alarm system with several flashing alarms that activate if motion is detected near the base component to prevent theft of a package left on its surface. The base component can be activated or deactivated with a remote and may be used in conjunction with a smart doorbell system. Further, the base component can comprise its own camera and notification system and can send a text message and a photo/video of the delivery to the user and/or the delivery service through a smartphone application.

5 Claims, 5 Drawing Sheets

PACKAGE ALARM MAT AND CONTAINER DEVICE

CROSS-REFERENCE TO RELATED APPLICATION

The present application claims priority to, and the benefit of, U.S. Provisional Application No. 63/337,219, which was filed on May 2, 2022, and is incorporated herein by reference in its entirety.

FIELD OF THE INVENTION

The present invention relates generally to the field of package alarm devices. More specifically, the present invention relates to an improved package alarm device that provides users with a mat or lockable storage box for identifying and securing delivered packages to prevent theft. Accordingly, the present disclosure makes specific reference thereto. Nonetheless, it is to be appreciated that aspects of the present invention are also equally applicable to other like applications, devices, and methods of manufacture.

BACKGROUND

By way of background, this invention relates to improvements in package alarm devices. The amount of merchandise being purchased online has significantly increased over the years. People may order numerous products online and have the products delivered directly to his/her front door. When packages are delivered, they are often left on a porch or in front of a doorway and are visible to others. If a customer is not home to immediately retrieve the package, some delivery personnel may leave the package near a front door unattended. This puts the package at risk for being stolen, which can be exceptionally upsetting no matter the price of the item. Every year there are millions of reported stolen packages that owners were unable to retrieve. Many of these packages contain costly items, such as electronics, jewelry, or clothing. Currently, there is no effective means to ensure the security of a delivered item. Accordingly, a device located outside of a building that is configured to securely store a package until an owner is able to retrieve it is desired.

Furthermore, some packages may be unable to be left at the door, forcing the recipient to track down the package or forcing the delivery driver to return the next day. Additionally, packages left at the door when an individual is not home can also result in packages being ruined by the weather. Thus, there is a need for protecting packages delivered to the doorsteps of online purchasers as well as for providing more reliable information relating to such deliveries. Accordingly, there is a need for a device which allows for an alarm to go off if a package is attempted to be stolen. There is also a need for a device which allows for an alert to be sent to a homeowner or authorities if a package is being stolen. Yet further still, there is a need for a device that allows for logging of delivered packages.

Therefore, there exists a long-felt need in the art for a package alarm device that provides users with a mat or lockable box capable of identifying and securing delivered packages to prevent theft. There is also a long-felt need in the art for a package alarm device that allows users to safely receive packages even when he or she is unavailable to physically retrieve the package upon delivery. Further, there is a long-felt need in the art for a package alarm device that features wireless capabilities within the mat or box to allow users to view the delivered items on their smartphone via an application. Moreover, there is a long-felt need in the art for a device that enables users to remotely monitor the mat or lockbox to remain up to date on the status of their deliveries and to obtain an alert if the packages are removed or stolen. Further, there is a long-felt need in the art for a package alarm device that offers a simple and convenient mat or lockable storage unit for homeowners to receive packages while traveling, at work, or otherwise away from home. Finally, there is a long-felt need in the art for a package alarm device that provides for the safety and protection of any type of delivered items, such as online orders, third-party delivery services, and food orders, etc.

The subject matter disclosed and claimed herein, in one embodiment thereof, comprises a package alarm device. The device is a storage box or door mat for delivered packages. The device comprises a base component with pressure sensors, such that when a package is placed on the base component, the weight and time of the package delivery are identified. Further, the base component comprises an alarm system with several flashing alarms that activate if motion is detected near the base component to prevent theft of a package left on its surface. The base component can be activated or deactivated with a remote and may be used in conjunction with a smart doorbell system. Further, the base component can comprise its own camera and notification system and can send a text message and a photo/video of the delivery to the user and/or the delivery service through a smartphone application. The storage box can also be remotely locked and unlocked through the smartphone application. Generally, the storage box provides the same security as the mat when used in conjunction with the mat by placing the storage box onto the mat. Both the mat and the storage box can be standalone units or used in conjunction with one another.

In this manner, the package alarm device of the present invention accomplishes all of the foregoing objectives and provides users with a device that protects and secures packages left on a mat or storage box. When a package is placed on the activated mat or storage box, the device time stamps the delivery and weighs the packages, then sends a photo/video and a text to the user and the service provider. If a package is removed from the mat/box, an alarm and flashing lights will activate in conjunction with a text message sent to the user.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a package alarm device. The device is a storage box or door mat for delivered packages. The device comprises a base component with pressure sensors, such that when a package is placed on the base component, the weight and time of the package delivery are identified. Further, the base component can comprise its own camera and notification system and can send a text message and a photo/video of the delivery to the user and/or the delivery service through a smartphone application. Additionally, the base component comprises an alarm system with several flashing alarms that activate if motion is detected near the base component to prevent theft of a package left on its surface.

In one embodiment, the package alarm device comprises a door mat or a storage box located on a doorstep or front porch of a house. The door mat or storage box comprises a base component. Typically, the base component can be any suitable size and shape as is known in the art and is utilized for housing the electronic components and sensors. The top of the base component forms a placement surface for a package and may include descriptive text to help ensure a delivery person delivering a package places the package correctly on the device.

In operation, when a package is placed on the base component, the device communicates through a wireless access point or wireless router to notify a package recipient (user) that the package has been delivered and the device also notifies the package recipient (user) of unauthorized removal of the package from the base component. Specifically, the package alarm device comprises an audible alarm and/or flashing lights that the device activates upon unauthorized removal of the package from the device. The device also includes a camera that captures images or records video of the doorstep and/or front porch of the house upon detection of motion on the doorstep upon detection of delivery of the package, or upon detection of unauthorized removal of the package from the device. Further, the base component can be activated or deactivated with a remote and the device may be used in conjunction with a smart doorbell system.

In one embodiment, the package alarm device is utilized for a residential house. However, the package alarm device may be utilized in any type of environment receiving deliveries of packages. For example, the package alarm device could be utilized at a company, a doctor's office, a hospital, a restaurant, etc., or any other suitable place as is known in the art.

In one embodiment, the base component of the package alarm device comprises a plurality of pressure sensors that generate a signal indicating whether a package has been placed on or removed from the pressure sensor. The sensor is transmitted to processing circuitry or a processor that controls the overall operation of the device. Upon receiving the signal indicating a package has been placed on the pressure sensor, the processor communicates a delivery notification over a wireless communications network to a remote electronic device or smartphone to notify a user of the remote electronic device that the package has been delivered. Typically, when a package is placed on the pressure sensors, the weight and time of the package delivery is identified. A text message of this delivery information is sent to the user and to the delivery service through a smartphone application.

Specifically, the processor communicates over the wireless communications network through wireless communications circuitry contained in the package alarm device. The wireless communications circuitry may be any suitable type of wireless communications circuitry such as Wi-Fi circuitry, Bluetooth circuitry, or other wireless local area network (WLAN) circuitry. Where the device is being utilized in a residential environment, such as a house, the wireless router contained in the house would communicate with the wireless communication circuitry over a wireless link utilizing a Wi-Fi communications standard.

The wireless communications network is meant to represent any communications networks over which the processor communicates with the remote electronic devices. Thus, although the wireless communications network is designated as a "wireless" communications network, this network includes any communications networks, whether wired or wireless, over which the processor of the device communicates with the remote electronic device. These communications networks, in addition to the WLAN network, may include the internet, cellular telephone networks, broadband networks including broadband optical networks, etc. The remote electronic device communicates over the wireless communications network through a wireless link utilizing a suitable standard. For example, where the remote electronic device is a smart phone, the wireless link corresponds to a suitable cellular network.

The remote electronic devices may be any suitable type of electronic device that can execute an application or "app" that provides a user of the remote electronic device with an interface to the package alarm device. Thus, the remote electronic devices may be a smart phone, a tablet computer, an ultrabook computer, a laptop computer, a desktop computer, or any other device suitable for running the app or a comparable program to allow the device to communicate over the wireless network with the package alarm device.

In one embodiment, the package alarm device comprises a camera which is also coupled to the WLAN of the house including the wireless router. The camera may be any suitable type of camera for recording still images and/or video. In one embodiment, the camera is motion activated and records photographs and/or video when motion is detected in the location of the device. In another embodiment, instead of being triggered by motion, the camera starts capturing images or video immediately in response to detection of a package being placed on or in the device. The camera can send the captured images and/or video to the app running on the remote electronic device so a user can view the captured images or video and forward the information to authorities if desired. The app also allows a user to access and configure the camera. In one embodiment, the app also receives notifications regarding operation of the camera, such as when batteries powering the camera are low and should be replaced. Similar notifications may also be provided to the app by the processor regarding batteries powering the device.

In one embodiment, the package alarm device further includes a device theft sensor that detects movement of the package from the base component. The device theft sensor may be, for example, an accelerometer or other suitable sensor that generates a signal in response to movement of the package. The signal is supplied to the processor which, in response to receiving the signal indicating movement of the device, generates an alarm signal that produces an audible alarm and/or flashing light to alert nearby people that an unauthorized person is moving the package. In response to the audible alarm and/or flashing lights indicating movement and presumed theft of the package, the processor may also communicate a theft notification through the wireless communications circuitry and over the wireless communications network to the remote electronic devices. Specifically, the audible alarm and/or flashing lights activate in conjunction with a text message sent to the user.

In operation, the remote electronic device may download and install the app and may thereafter utilize the app to connect the package alarm device to the wireless router and thereby to the wireless communications network. In an alternative embodiment, the package alarm device may be directly wired to a user's home security system or connected wirelessly to the home security system, the wireless communication system, or a smart doorbell system.

The package alarm device is positioned in the desired location on the doorstep and/or front porch of a house. Once in position on the doorstep/front porch, the package alarm device operates in a standby mode. In the standby mode, the processor monitors the pressure sensor, theft sensors and communications from the remote electronic devices.

In one embodiment, the device itself is configured to sound an audible alarm and/or flashing lights if the device is moved a selected distance from or above the porch. This can deter a potential thief from removing the package alarm device in advance of a delivery to avoid the alarm. In this embodiment, the user will be informed (via text) that the device has been moved outside of the user defined range from the house. As in other embodiments, the camera may also provide images of the porch in this situation.

The package alarm device operates in the package delivered mode in response to a signal from the pressure sensor indicating that a package has been placed on the pressure sensor. In response to the signal indicating a package has been placed on the pressure sensor, the processor sends a delivery notification over the wireless communications network to the remote electronic devices via a text message to the user and the delivery service. In addition to the delivery notification indicating that a new package has been delivered by being physically placed on the pressure sensor, this delivery notification also includes the date and time of the delivery. The delivery notification may further include the weight of the delivered package.

Upon receiving the delivery notification, the app running on the remote electronic device provides a notification to a user that a package has been delivered. This notification may take a variety of forms and could include an audible tone as well as a visual alert for the user, such as a text message. In one embodiment, the camera can provide live video or an image of the porch to the app showing the package on the package alarm device.

Each time a new package is placed on the pressure sensor, the pressure sensor generates a signal indicating delivery of a new package has been detected and the processor sends a corresponding delivery notification to the remote electronic device. In this way, users of the remote electronic device are notified of each package delivery.

Simultaneous placement of multiple packages on the pressure sensor will, with this approach, be detected as delivery of a single package. Thus, each package delivery notification communicated by the processor to the remote electronic device may indicate that a single new package has been placed on the pressure sensor or multiple new packages have simultaneously been placed on the pressure sensor. The latter would occur where a delivery person stacks multiple packages and then simultaneously places these stacked packages on the pressure sensor of the package alarm device.

Once the device has at least once indicated that delivery of at least one package has occurred, the device operates in the unauthorized package removal mode if a signal indicates a package has been removed from the pressure sensor without authorization.

When a package or packages is removed, the device sends an alarm notification to the remote electronic device and activates the audible alarm and/or flashing lights indicating unauthorized removal of the package or packages.

In response to receipt of the alarm notification, the app running on the remote electronic device displays an alarm triggered notification to notify the user of the remote electronic device that an unauthorized event has occurred. This notification may also take a variety of forms and could include an audible tone as well as a visual alert for the user, such as a text message. Further, the user may opt to have the real time video or image stream of the porch be provided to the app so that when an alarm has triggered, the user can determine whether to disable the alarm. If the user has a security system, the app may correspond with the security system or smart doorbell system, such that the user may inform their security provider that there is an active theft at their home and to send someone to their home immediately.

Typically, once the user of the remote electronic device has been notified that a package or packages have been delivered, the user must input his intent to retrieve the package on the app. In one embodiment, a user must input a personal identification number (PIN), or some other secret code, in order to retrieve a package. In one embodiment, the package alarm device may include a fingerprint sensor or a keypad, such that the user can deactivate the device to retrieve their packages by scanning their fingerprint or entering in a pin number.

In another embodiment of the device, the device can further include a tracking beacon, such as a Global Positioning System (GPS) tracking beacon, which provides location or position information for the device. This position information could then be accessed by the app to allow a user to identify the location of the device in the event the device is stolen.

In one embodiment, the device can be secured to a surface to dissuade theft of the device and also prevent innocent movement of the device that could result in inadvertent triggering of the alarms and sensors. The device may be attached to the desired surface in any suitable way, such as mounted to the desired surface through heavy-duty double-sided tape or adhesive pads, etc. In one embodiment, the device is secured via a tether to an anchor located on the front porch/stoop. The tether prevents theft of the device and secures the device to a home or other structure.

In one embodiment, the base component of the device is a rectangular door mat, however the door mat can be any suitable shape as is known in the art. The door mat could, for example, be circular, oval, or square in shape in alternative embodiments. In yet another possible embodiment, the base component of the device is a storage box or container. The storage box may include a lid or cover. The electronics and sensors of the device are positioned at the bottom of the storage box. In one embodiment, the storage box comprises a housing including a base, one or more sidewalls, a lid, an interior volume configured to store mail such as envelopes, packages, and other items therein, an alarm system including one or more sensors and a camera configured to detect intruders and notify users of attempted intrusions.

In one embodiment, the storage box or container can comprise a cooling component and/or a heating component contained therein to maintain a user specified temperature. Specifically, the storage box or container would contain a heat exchanger, a fan and a thermostat that can be set by a user. Further, the thermostat could be controlled manually or via the smart phone application.

The lid is hingedly connected to a sidewall of the housing and is configured to pivot between an open position and a closed position for selectively providing access to the interior volume. The lid includes a door lock including an input for unlocking the lid when secured to the housing and an automated locking mechanism configured to automatically lock the lid when in a closed position. The door lock is programmable with a security access code that unlocks the lid and allows entry into the storage box.

In this embodiment, a delivery person opens the cover and places a package being delivered inside the storage box and thereafter, closes the cover. The electronics and sensors detect delivery and removal of packages to and from the storage box as previously described. This embodiment is utilized in applications where it is advantageous if the package being delivered is somewhat isolated from environmental elements and kept out of the site of people that may be passing by the device. Such a storage box can protect packages from the weather or be beneficial for light weight packages that may be moved by wind, such as the manilla envelopes.

In another embodiment, the storage box may include a locking mechanism in the lid, such that when the delivery person closes the lid, the locking mechanism seals the lid. In the event that there is another package to deliver, the delivery person may select a button on the top of the lid or elsewhere on the device that indicates they have a package to deliver. This will then send a signal to the user through the app that there is a delivery. The user can then remotely unlock the lid to allow the delivery person to place the next package in the storage box. Typically, the storage box can be remotely unlocked and locked through the app.

In one embodiment, the storage box provides the same security as the door mat when used in conjunction with the door mat, by placing the storage box onto the door mat. Thus, both the door mat and the storage box can be standalone units or used in conjunction with one another.

In one embodiment, the package alarm device is preferably fabricated from UV-stabilized plastic, such as polypropylene, polycarbonate, polyurethane, or other flexible, resilient, commercially available plastics, or lightweight metals, such as galvanized aluminum, stainless steel, powder-coated aluminum, etc.

In yet another embodiment, the package alarm device comprises a plurality of indicia.

In yet another embodiment, a method of securing and protecting package deliveries when a user is not home is disclosed. The method includes the steps of providing a package alarm device comprising a storage box or mat with a base component, wherein the base component comprises pressure sensors, an alarm system, a camera, and a notification system that communicates through a smartphone application. The method also comprises activating the mat or the storage box. Further, the method comprises placing a package on the mat or storage box. The method comprises time stamping and weighing the package. The method also comprises sending a photo/video and a text to the user and the service provider with the information. The method comprises if the package is removed, sounding the alarm and flashing lights. Finally, sending a text message to a user to alert them of the theft.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
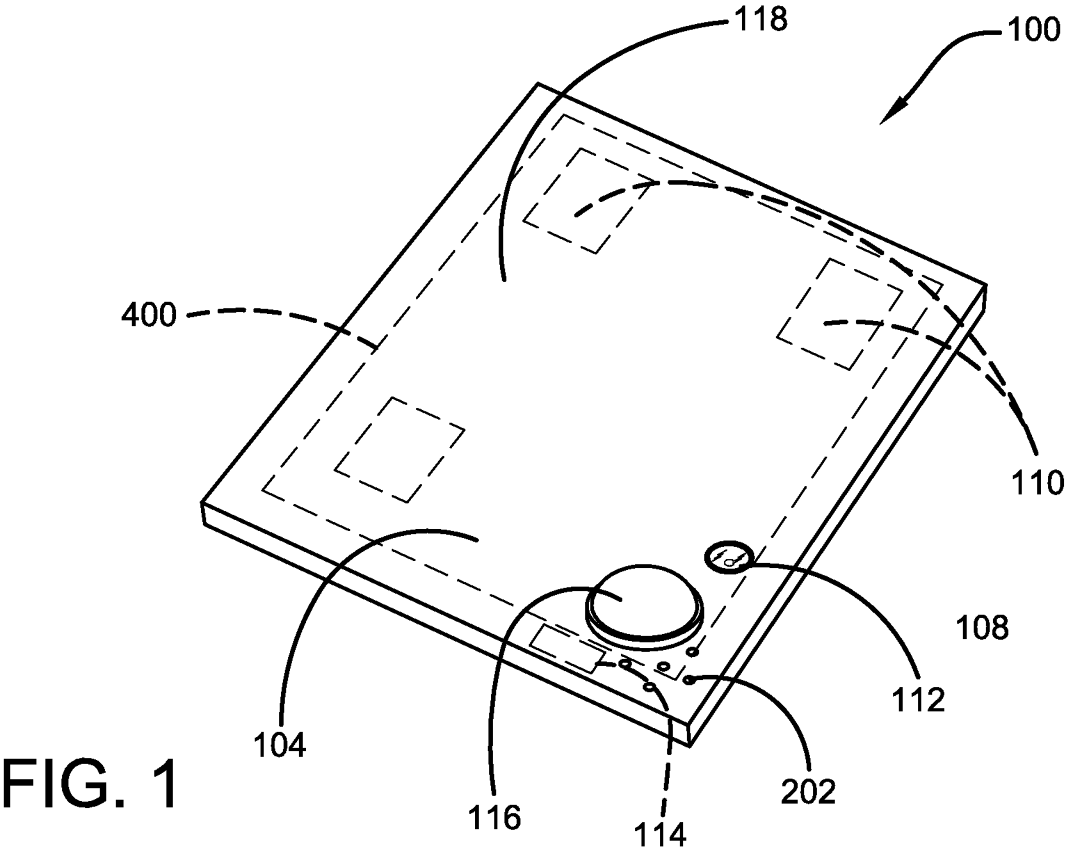
FIG. 1 illustrates a perspective view of one embodiment of the package alarm device of the present invention disclosing the lights and speakers on the mat in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a package alarm device that provides users with a mat or lockable box capable of identifying and securing delivered packages to prevent theft. There is also a long-felt need in the art for a package alarm device that allows users to safely receive packages when he or she is unavailable to physically retrieve the package upon delivery. Further, there is a long-felt need in the art for a package alarm device that features wireless capabilities within the mat or box to allow users to view the delivered items on their smartphone via an application. Moreover, there is a long-felt need in the art for a device that enables users to remotely monitor the mat or lockbox to remain up to date on the status of their deliveries and to obtain an alert if the packages are removed or stolen. Further, there is a long-felt need in the art for a package alarm device that offers a simple and convenient mat or lockable storage unit for homeowners needing to receive packages while traveling, at work, or otherwise away from home. Finally, there is a long-felt need in the art for a package alarm device that provides for the safety and protection of any type of delivered items, such as online orders, third-party delivery services, and food orders, etc.

The present invention, in one exemplary embodiment, is a novel package alarm device. The device is a storage box or door mat for delivered packages. The device comprises a base component with pressures sensors, such that when a package is placed on the base component, the weight and time of the package delivery is identified. Further, the base component comprises an alarm system with several flashing alarms that activate if motion is detected near the base component to prevent theft of a package left on its surface. The base component can be activated or deactivated with a remote and may be used in conjunction with a smart doorbell system. Further, the base component can comprise its own camera and notification system and can send a text message and a photo/video of the delivery to the user and/or the delivery service through a smartphone application. The present invention also includes a novel method of securing and protecting package deliveries when a user is not home. The method includes the steps of providing a package alarm device comprising a storage box or mat with a base component, wherein the base component comprises pressure sensors, an alarm system, a camera, and a notification system that communicates through a smartphone application. The method also comprises activating the mat or the storage box. Further, the method comprises placing a package on the mat or storage box. The method comprises time stamping and weighing the package. The method also comprises sending a photo/video and a text to the user and the service provider with the information. The method comprises if the package is removed, sounding the alarm and flashing lights. Finally, sending a text message to a user to alert them of the theft.

Referring initially to the drawings, FIG. 1 illustrates a perspective view of one embodiment of the package alarm device 100 of the present invention. In the present embodiment, the package alarm device 100 is an improved package alarm device 100 that protects and secures delivered packages when a user is not home. The device 100 is typically shown as a storage box 102 or door mat 104 for delivered packages 106. The package alarm device 100 comprises a base component 108 with pressure sensors 110, such that when a package 106 is placed on the base component 108, the weight and time of the package delivery is identified. Further, the base component 108 can comprise its own camera 112 and notification system and can send a text message and a photo/video of the delivery to the user and/or the delivery service through a smartphone application. Additionally, the base component 108 comprises an alarm system 114 with several flashing alarms 116 that activate if motion is detected near the base component 108 to prevent theft of a package 106 left on its surface.

Furthermore, the package alarm device 100 comprises a door mat 104 or a storage box 102 located on a doorstep or front porch 200 of a house. The door mat 104 or storage box 102 comprises a base component 108. Typically, the base component 108 can be any suitable size and shape as is known in the art and is utilized for housing the electronic components and sensors. The top 118 of the base component 108 forms a placement surface for a package 106 and may include descriptive text to help ensure a delivery person delivering a package 106 places the package 106 correctly on the device 100.

Figure 2:
FIG. 2 illustrates a perspective view of one embodiment of the package alarm device of the present invention showing delivered packages on the mat in accordance with the disclosed architecture.

As shown in FIG. 2, in operation, when a package 106 is placed on the base component 108, the device 100 communicates through a wireless access point or wireless router to notify a package recipient (user) that the package 106 has been delivered and the device 100 also notifies the package recipient (user) of unauthorized removal of the package 106 from the base component 108. Specifically, the package alarm device 100 comprises an audible alarm 202 and/or flashing lights 116 that the device 100 activates upon unauthorized removal of the package 106 from the device 100. The device 100 also includes a camera 112 that captures images or records video of the doorstep and/or front porch 200 of the house upon detection of motion on the doorstep, upon detection of delivery of the package 106, or upon detection of unauthorized removal of the package 106 from the device 100. Further, the base component 108 can be activated or deactivated with a remote and/or a smartphone device 204 and the device 100 may be used in conjunction with a smart doorbell system (not shown).

In one embodiment, the package alarm device 100 is utilized for a residential house. However, the package alarm device 100 may be utilized in any type of environment receiving deliveries of packages 106. For example, the package alarm device 100 could be utilized at a company, a doctor's office, a hospital, a restaurant, etc., or any other suitable place as is known in the art, depending on the needs and/or wants of a user.

Figure 3:
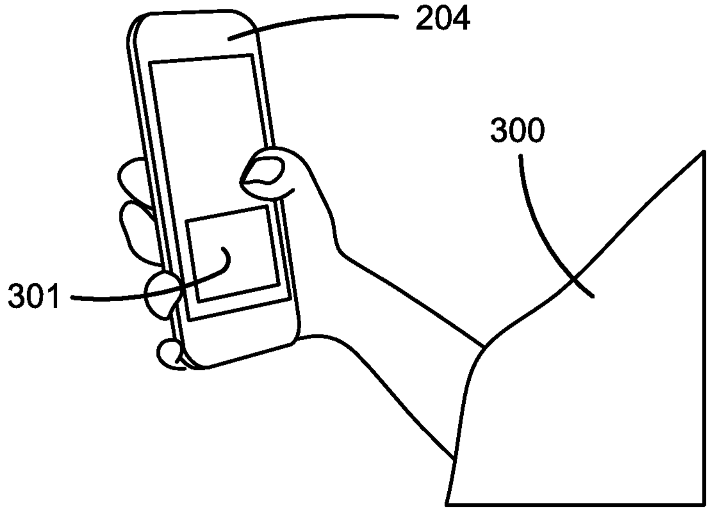
FIG. 3 illustrates a perspective view of one embodiment of the package alarm device of the present invention showing how the mat communicates with a smartphone application in accordance with the disclosed architecture.

As shown in FIG. 3, the base component 108 of the package alarm device 100 comprises a plurality of pressure sensors 110 that generate a signal indicating whether a package 106 has been placed on or removed from the pressure sensor 110. The sensor 110 is transmitted to processing circuitry or a processor that controls the overall operation of the device 100. Upon receiving the signal indicating a package 106 has been placed on the pressure sensor 110, the processor communicates a delivery notification over a wireless communications network to a remote electronic device or smartphone 204 to thereby notify a user 300 of the remote electronic device 204 that the package 106 has been delivered. Typically, when a package 106 is placed on the pressure sensors 110, the weight and time of the package delivery is identified. A text message 302 of this delivery information is sent to the user 300 and to the delivery service through a smartphone application 304.

Specifically, the processor communicates over the wireless communications network through wireless communications circuitry contained in the package alarm device 100. The wireless communications circuitry may be any suitable type of wireless communications circuitry such as Wi-Fi circuitry, Bluetooth circuitry, or other wireless local area network (WLAN) circuitry. Where the device 100 is being utilized in a residential environment, such as a house, the wireless router contained in the house would communicate with the wireless communication circuitry over a wireless link utilizing a Wi-Fi communications standard.

The wireless communications network is meant to represent any communications networks over which the processor communicates with the remote electronic devices 204. Thus, although the wireless communications network is designated as a "wireless" communications network, this network includes any communications networks, whether wired or wireless, over which the processor of the device 100 communicates with the remote electronic device 204. These communications networks, in addition to the WLAN network, may include the internet, cellular telephone networks, broadband networks including broadband optical networks, etc. The remote electronic device 204 communicates over the wireless communications network through a wireless link utilizing a suitable standard. For example, where the remote electronic device 204 is a smart phone, the wireless link corresponds to a suitable cellular network.

Figure 4:
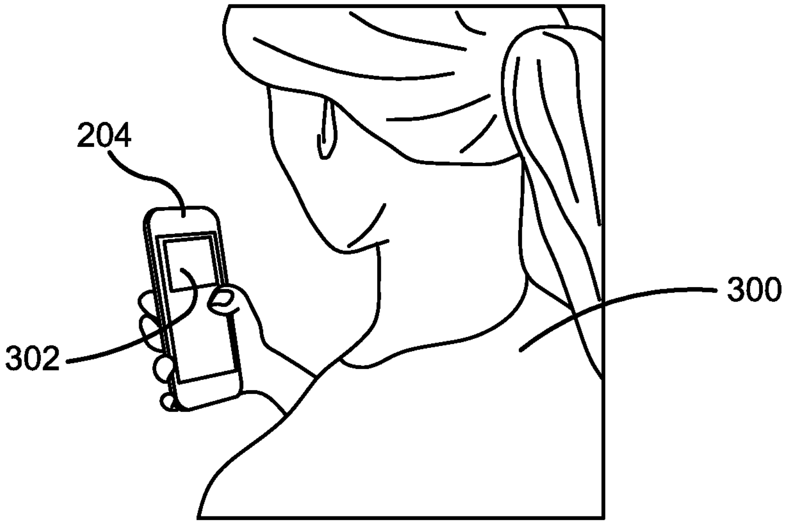
FIG. 4 illustrates a perspective view of one embodiment of the package alarm device of the present invention showing how the tamper alert is sent if the packages are stolen in accordance with the disclosed architecture.

As shown in FIG. 4, the remote electronic device 204 may be any suitable type of electronic device that can execute an application or "app" that provides a user 300 of the remote electronic device 204 with an interface to the package alarm device 100. Thus, the remote electronic device 204 may be a smart phone, a tablet computer, an ultrabook computer, a laptop computer, a desktop computer, or any other device suitable for running the app or a comparable program to allow the device to communicate over the wireless network with the package alarm device 100.

Further, the package alarm device 100 comprises a camera 112 which is also coupled to the WLAN of the house including the wireless router. The camera 112 may be any suitable type of camera for recording still images and/or video. In one embodiment, the camera 112 is motion activated and records photographs and/or video when motion is detected in the location of the device 100. In another embodiment, instead of being triggered by motion, the camera 112 starts capturing images or video immediately in response to detection of a package 106 being placed on or in the device 100. The camera 112 can send the captured images and/or video to the app 304 running on the remote electronic device 204 so a user can view the captured images or video and forward the information to authorities if desired. The app 304 also allows a user 300 to access and configure the camera 112. In one embodiment, the app 304 also receives notifications regarding operation of the camera 112, such as when batteries powering the camera 112 are low and should be replaced. Similar notifications may also be provided to the app 304 by the processor regarding batteries powering the device 100.

Additionally, the package alarm device 100 further includes a device theft sensor 400 that detects movement of the package 106 from the base component 108. The device theft sensor 400 may be, for example, an accelerometer or other suitable sensor that generates a signal in response to movement of the package 106. The signal is supplied to the processor which, in response to receiving the signal indicating movement of the device 100, generates an alarm signal that produces an audible alarm 202 and/or flashing light 116 to alert nearby people that an unauthorized person is moving the package 106. In response to the audible alarm 202 and/or flashing lights 116 indicating movement and presumed theft of the package 106, the processor may also communicate a theft notification through the wireless communications circuitry and over the wireless communications network to the remote electronic devices 204. Specifically, the audible alarm 202 and/or flashing lights 116 activate in conjunction with a text message 302 sent to the user 300.

Figure 5:
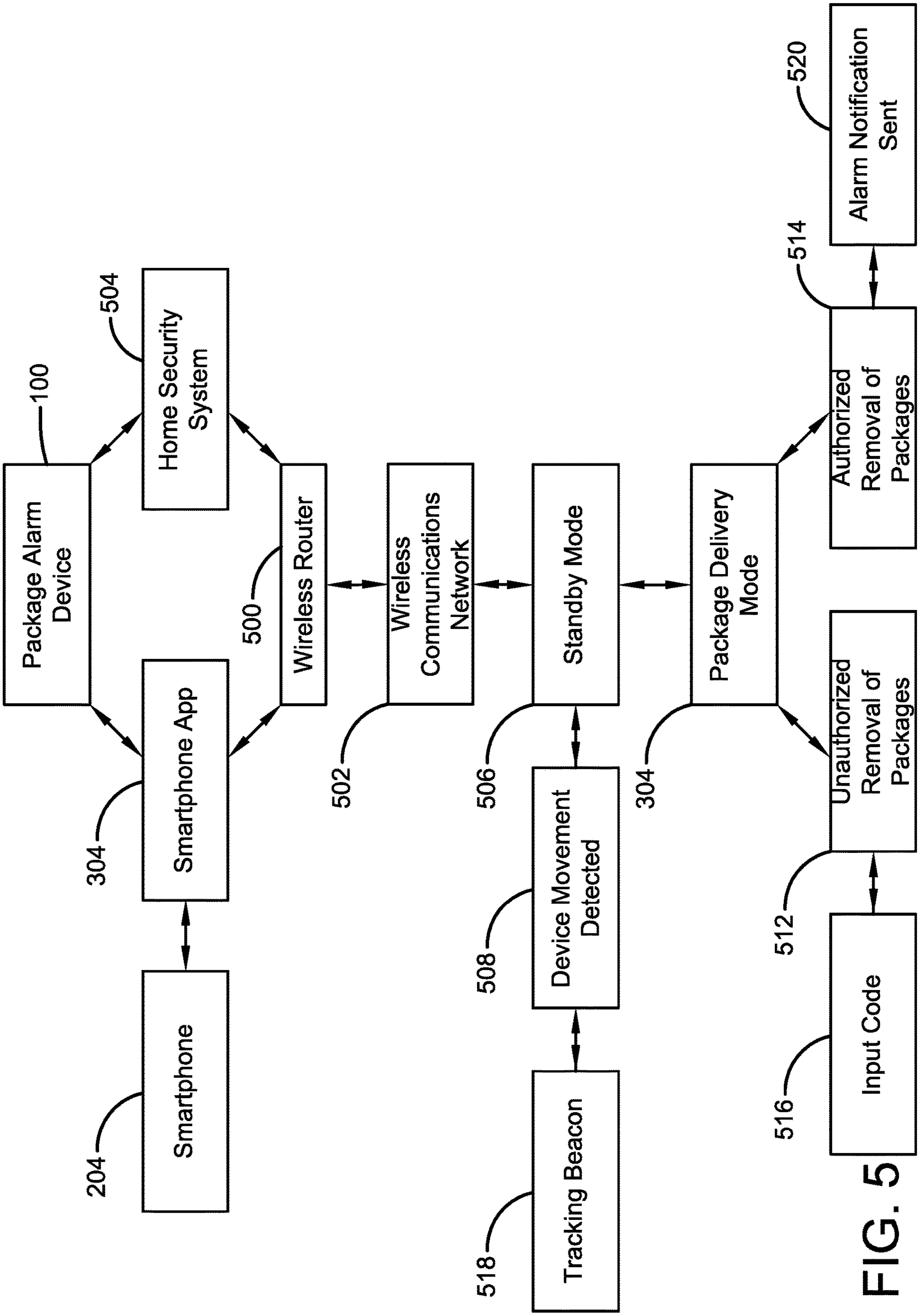
FIG. 5 illustrates a flowchart showing the operation of the package alarm device in accordance with the disclosed architecture.

As shown in FIG. 5, in operation, the remote electronic device 204 may download and install the app 304 and may thereafter utilize the app 304 to connect the package alarm device 100 to the wireless router 500 and thereby to the wireless communications network 502. In an alternative embodiment, the package alarm device 100 may be directly wired to a user's home security system 504 or connected wirelessly to the home security system 504 or the wireless communication system, or a smart doorbell system.

The package alarm device 100 is positioned in the desired location on the doorstep and/or front porch 200 of a house. Once in position on the doorstep/front porch 200, the package alarm device 100 operates in a standby mode 506. In the standby mode 506, the processor monitors the pressure sensor, theft sensors and communications from the remote electronic devices 204.

Furthermore, the device 100 itself is configured to sound an audible alarm 202 and/or flashing lights 116 if the device 100 is moved (device movement mode 508) a selected distance from or above the porch. This can deter a potential thief from removing the package alarm device 100 in advance of a delivery to avoid the alarm. In this embodiment, the user will be informed (via text) that the device 100 has been moved outside of the user defined range from the house. As in other embodiments, the camera 112 may also provide images of the porch in this situation.

The package alarm device 100 operates in the package delivered mode 510 in response to a signal from the pressure sensor 110 indicating that a package 106 has been placed on the pressure sensor 110. In response to the signal indicating a package 106 has been placed on the pressure sensor 110, the processor sends a delivery notification over the wireless communications network to the remote electronic devices 204 via a text message to the user and the delivery service. In addition to the delivery notification indicating that a new package 106 has been delivered by being physically placed on the pressure sensor 110, this delivery notification also includes the date and time of the delivery. The delivery notification may further include the weight of the delivered package 106.

Upon receiving the delivery notification, the app 304 running on the remote electronic devices 204 provides a notification to a user 300 that a package 106 has been delivered. This notification may take a variety of forms and could include an audible tone as well as a visual alert for the user, such as a text message. In one embodiment, the camera 112 can provide live video or an image of the porch to the app showing the package 106 on the package alarm device 100.

Each time a new package 106 is placed on the pressure sensor 110, the pressure sensor 110 generates a signal indicating delivery of a new package 106 has been detected and the processor sends a corresponding delivery notification to the remote electronic device 204. In this way, users of the remote electronic device 204 are notified of each package delivery.

Simultaneous placement of multiple packages 106 on the pressure sensor 110 will, with this approach, be detected as delivery of a single package 106. Thus, each package delivery notification communicated by the processor to the remote electronic device 204 may indicate that a single new package 106 has been placed on the pressure sensor 110 or multiple new packages 106 have simultaneously been placed on the pressure sensor 110. The latter would occur where a delivery person stacks multiple packages 106 and then simultaneously places these stacked packages 106 on the pressure sensor 110 of the package alarm device 100.

Once the device 100 has at least once indicated that delivery of at least one package 106 has occurred, the device 100 operates in the unauthorized package removal mode 512 if a signal indicates a package 106 has been removed from the pressure sensor 110 without authorization.

When a package 106 or packages is removed, the device 100 sends an alarm notification to the remote electronic device 204 and activates the audible alarm 202 and/or flashing lights 116 indicating unauthorized removal of the package 106 or packages.

In response to receipt of the alarm notification, the app 304 running on the remote electronic device 204 displays an alarm triggered notification to notify the user of the remote electronic device 204 that an unauthorized event has occurred. This notification may also take a variety of forms and could include an audible tone as well as a visual alert for the user, such as a text message 302. Further, the user 300 may opt to have the real time video or image stream of the porch be provided to the app 304 so that when an alarm has triggered, the user can determine whether to disable the alarm. If the user has a security system, the app 304 may correspond with the security system 504 or smart doorbell system, such that the user may inform their security provider that there is an active theft at their home and to send someone to their home immediately.

Typically, once the user 300 of the remote electronic device 204 has been notified that a package 106 or packages have been delivered, the user 300 must input his intent to retrieve the package on the app 304 (authorized removal of packages 514). In one embodiment, a user 300 must input a personal identification number (PIN), or some other secret code 516, in order to retrieve a package 106. In one embodiment, the package alarm device 100 may include a fingerprint sensor or a keypad such that the user can deactivate the device 100 to retrieve their packages 106 by scanning their fingerprint or entering in a pin number.

In another embodiment of the device 100, the device 100 can further include a tracking beacon 518, such as a Global Positioning System (GPS) tracking beacon, which provides location or position information for the device 100. This position information could then be accessed by the app 304 to allow a user to identify the location of the device 100 in the event the device 100 is stolen.

In one embodiment, the device 100 can be secured to a surface to dissuade theft of the device 100 and also prevent innocent movement of the device 100 that could result in inadvertent triggering of the alarms and sensors. The device 100 may be attached to the desired surface in any suitable way, such as mounted to the desired surface through heavy-duty double-sided tape or adhesive pads, etc. Further, in one embodiment, the device 100 is secured via a tether 714 to an anchor 716 located on the front porch/stoop. The tether 714 prevents theft of the device 100 and secures the device 100 to a home or other structure.

Figure 6:
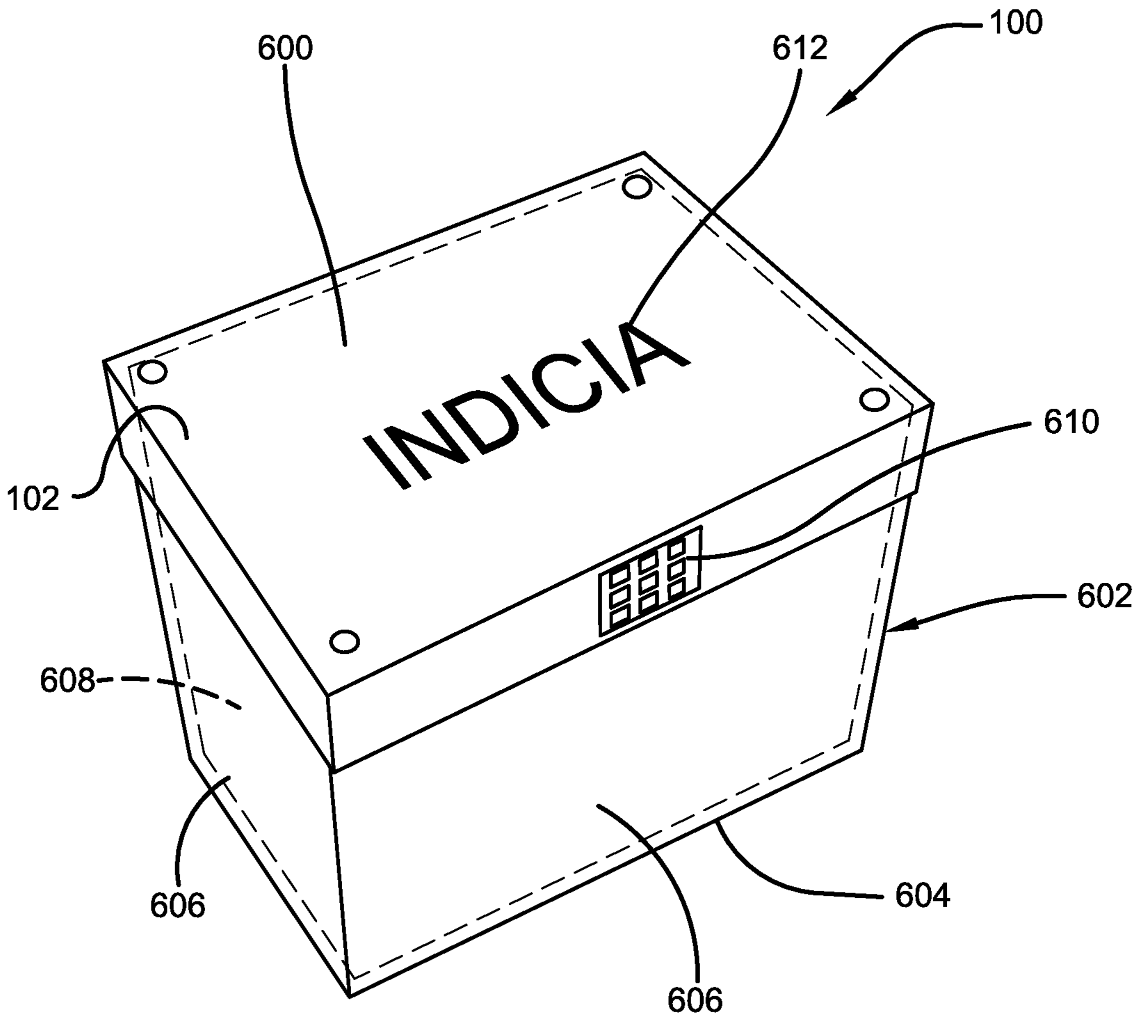
FIG. 6 illustrates a perspective view of one embodiment of the package alarm device of the present invention showing the remote locking storage box in accordance with the disclosed architecture.

As shown in FIG. 6, the base component 108 of the device 100 is a rectangular door mat 104, however the door mat 104 can be any suitable shape as is known in the art. The door mat 104 could, for example, be circular, oval, or square in shape in alternative embodiments. In yet another possible embodiment, the base component 108 of the device 100 is a storage box 102 or container. The storage box 102 may include a lid 600 or cover. The electronics and sensors of the device 100 are positioned at the bottom of the storage box 102. In one embodiment, the storage box 102 comprises a housing 602 including a base 604, one or more sidewalls 606, a lid 600, an interior volume 608 configured to store mail such as envelopes, packages, and other items therein, an alarm system 114 including one or more sensors 110, 400 and a camera 112 configured to detect intruders and notify users of attempted intrusions.

In one embodiment, the storage box or container 102 can comprise a cooling component 718 and/or a heating component 720 contained therein to maintain a user specified temperature. Specifically, the storage box or container 102 would contain a heat exchanger 722, a fan 724 and a thermostat 726 that can be set by a user. Further, the thermostat 726 could be controlled manually or via the smart phone application.

The lid 600 is hingedly connected to a sidewall 606 of the housing 602 and is configured to pivot between an open position and a closed position for selectively providing access to the interior volume 608. The lid 600 includes a door lock 610 including an input for unlocking the lid 600 when secured to the housing 602 and an automated locking mechanism configured to automatically lock the lid 600 when in a closed position. The door lock 610 is programmable with a security access code that unlocks the lid 600 and allows entry into the storage box 102.

In this embodiment, a delivery person opens the cover 600 and places a package 106 being delivered inside the storage box 102 and thereafter closes the cover 600. The electronics and sensors detect delivery and removal of packages 106 to and from the storage box 102 as previously described. This embodiment is utilized in applications where it is advantageous if the package 106 being delivered is somewhat isolated from environmental elements and kept out of the site of people that may be passing by the device 100. Such a storage box 102 can protect packages 106 from the weather or be beneficial for lightweight packages that may be moved by wind, such as the manilla envelopes.

In another embodiment, the storage box 102 may include a locking mechanism in the lid 600, such that when the delivery person closes the lid 600 the locking mechanism seals the lid 600. In the event that there is another package 106 to deliver, the delivery person may select a button on the top of the lid 600 or elsewhere on the device 100 that indicates they have a package 106 to deliver. This will then send a signal to the user 300 through the app 304 that there is a delivery. The user 300 can then remotely unlock the lid 600 to allow the delivery person to place the next package 106 in the storage box 102. Typically, the storage box 102 can be remotely unlocked and locked through the app 304.

In one embodiment, the storage box 102 provides the same security as the door mat 104 when used in conjunction with the door mat 104, by placing the storage box 102 onto the door mat 104. Thus, both the door mat 104 and the storage box 102 can be standalone units or used in conjunction with one another.

Additionally, the package alarm device 100 is preferably fabricated from UV-stabilized plastic, such as polypropylene, polycarbonate, polyurethane, or other flexible, resilient, commercially available plastics, or lightweight metals, such as galvanized aluminum, stainless steel, powder-coated aluminum, etc., or any other suitable material as is known in the art, such as but not limited to, acrylonitrile-butadiene-styrene (ABS), acrylic, polyethylene, thermoplastics, polyethylene terephthalate, polyvinyl chloride, polystyrene, polylactic acid, etc. Additionally, the package alarm device 100 is also manufactured from a material that is water resistant or waterproof, or the base component 108 comprises a coating that is water resistant or waterproof.

Furthermore, the package alarm device 100 comprises a plurality of indicia 612. The base component 108 of the device 100 may include advertising, a trademark, or other letters, designs, or characters, printed, painted, stamped, or integrated into the base component 108, or any other indicia 612 as is known in the art. Specifically, any suitable indicia 612 as is known in the art can be included, such as, but not limited to, patterns, logos, emblems, images, symbols, designs, letters, words, characters, animals, advertisements, brands, etc., that may or may not be package or brand related.

Figure 7:
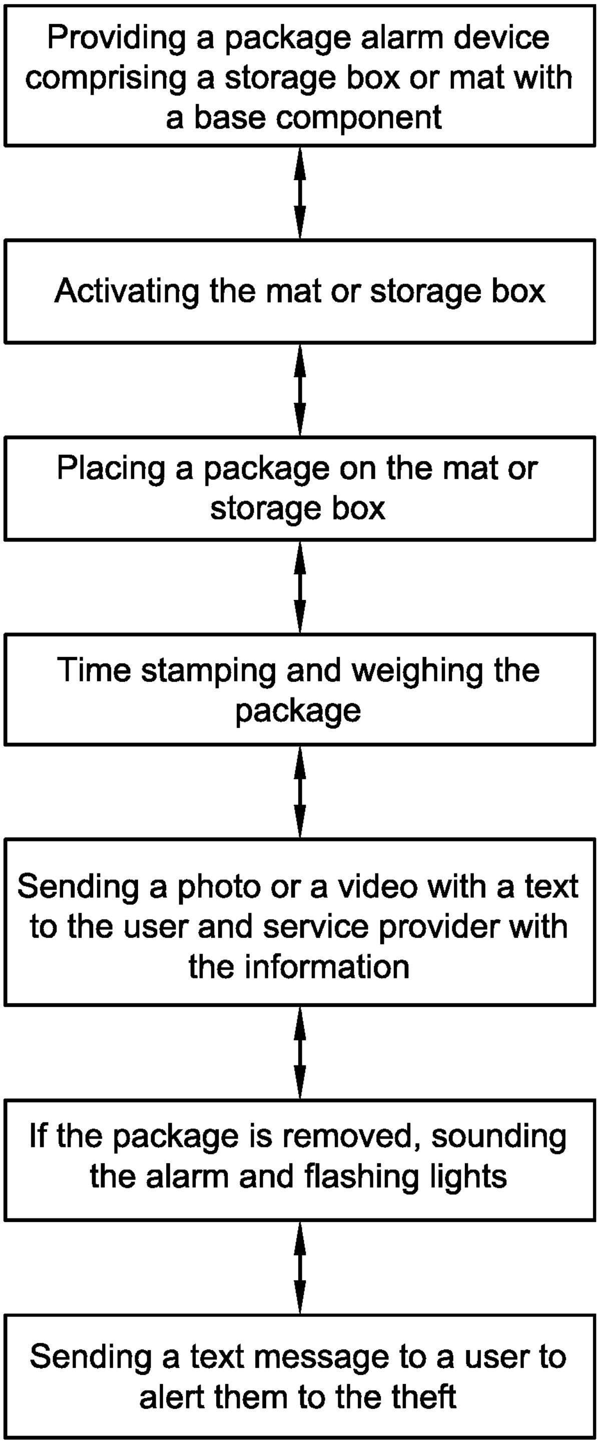
FIG. 7 illustrates a flowchart showing the method of securing and protecting package deliveries when a user is not home in accordance with the disclosed architecture.

FIG. 7 illustrates a flowchart of the method of securing and protecting package deliveries when a user is not home. The method includes the steps of at 700, providing a package alarm device comprising a storage box or mat with a base component, wherein the base component comprises pressure sensors, an alarm system, a camera, and a notification system that communicates through a smartphone application. The method also comprises at 702, activating the mat or the storage box. Further, the method comprises at 704, placing a package on the mat or storage box. The method comprises at 706, time stamping and weighing the package. The method also comprises at 708, sending a photo/video and a text to the user and the service provider with the information. The method comprises at 710, if the package is removed, sounding the alarm and flashing lights. Finally, at 712, sending a text message to a user to alert them of the theft.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "package alarm device", "alarm device", and "device" are interchangeable and refer to the package alarm device 100 of the present invention.

Notwithstanding the foregoing, the package alarm device 100 of the present invention can be of any suitable size and configuration as is known in the art without affecting the overall concept of the invention, provided that it accomplishes the above-stated objectives. One of ordinary skill in the art will appreciate that the package alarm device 100 as shown in FIGS. 1-7 are for illustrative purposes only, and that many other sizes and shapes of the package alarm device 100 are well within the scope of the present disclosure. Although the dimensions of the package alarm device 100 are important design parameters for user convenience, the package alarm device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A package alarm device for protecting and securing delivered packages when a user is not home, the package alarm device comprising:

a base component configured to be activated or deactivated through a smartphone device;

a plurality of pressure sensors;

a heating and cooling component;

a camera;

a tether and an anchor;

a theft sensor; and an alarm system;

wherein communications from the plurality of pressure sensors, the camera, the theft sensor, and the alarm system are sent through a smartphone application; and wherein the package alarm device communicates through a wireless access point or wireless router to notify a user of activity on the base component; and wherein when a package is placed in the base component, the pressure sensor is activated and weight and time of the package is identified and transmitted to a user, and the camera is activated and a photo or video of delivery is sent to a user; and wherein when the package is removed from the base component, the alarm system activates, flashing alarms and sounding audible alarms, and the theft sensor is activated which notifies a user via a text message; and wherein the base component is a UV-stabilized plastic storage box comprising a remotely lockable lid operable via the smartphone application.

2. The package alarm device of claim 1 further comprising a plurality of indicia.

3. The package alarm device of claim 1, wherein the smartphone device downloads the smartphone application to connect the package alarm device to the wireless router and thereby to a wireless communications network.

4. The package alarm device of claim 1, wherein the storage box comprises a housing, a base, and multiple sidewalls.

5. A method of securing and protecting package deliveries when a user is not home, the method comprising the steps of:

providing a package alarm device comprising a base component, wherein the base component comprises pressure sensors, an alarm system, a camera, and a notification system that communicates through a smartphone application; activating the mat or the storage box, wherein the base component is configured to be activated or deactivated through a smartphone device;

placing a package on the mat or storage box;

time stamping and weighing the package;

sending a photo or video and a text to the user and the service provider with the information;

sounding the alarm and flashing lights when the package is removed; and sending a text message to a user to alert them of the theft; and wherein the base component is a UV-stabilized plastic storage box comprising a remotely lockable lid operable via the smartphone application.

* * * * *